INVENTOR.
Tomoyoshi Mikoshiba
Eiichi Hori
Shingo Ishizawa
Yasuo Suzuki

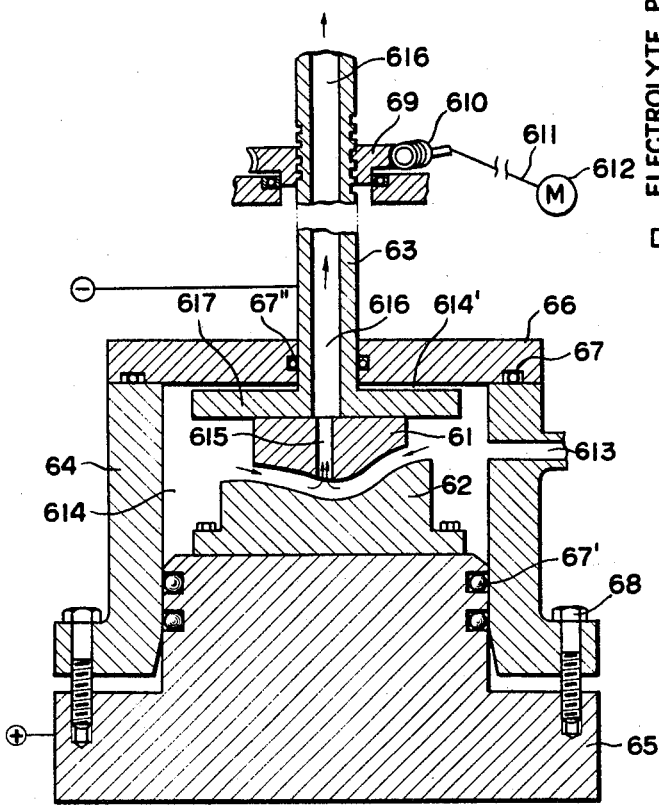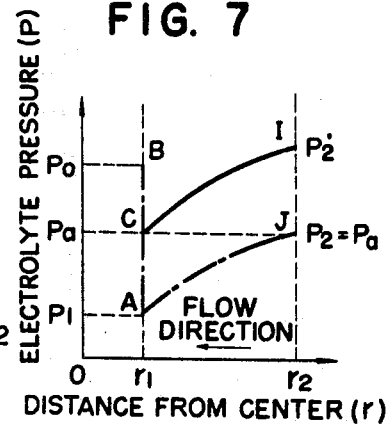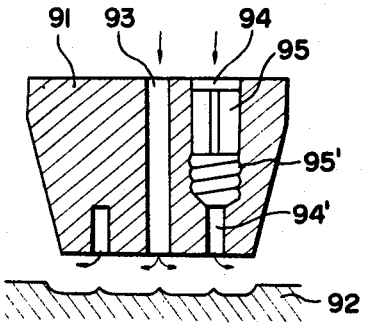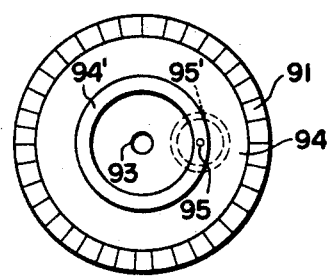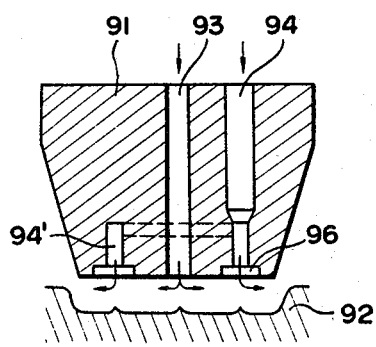

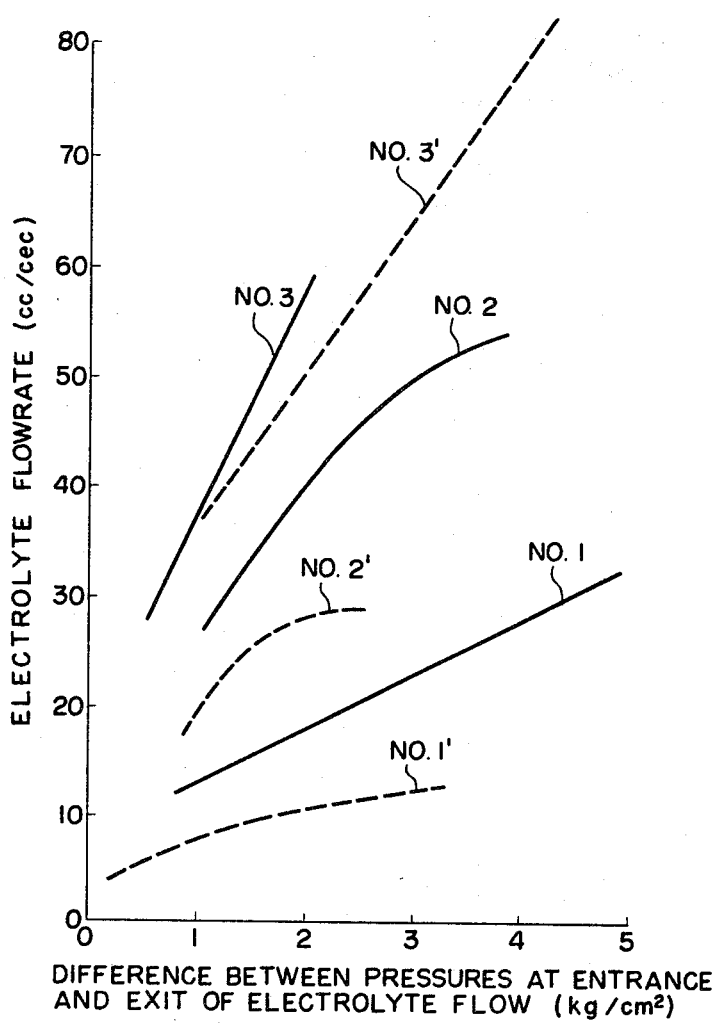

H. Edward Western

United States Patent Office 3,399,125
Patented Aug. 27, 1968

3,399,125
ELECTROCHEMICAL MACHINING IN A PRESSURIZED CHAMBER SUBSTANTIALLY WITHOUT THE FORMATION OF GAS BUBBLES
Tomoyoshi Mikoshiba and Eiichi Hori, Kokubunji-shi, Shingo Ishizawa, Hachioji-shi, and Yasuo Suzuki, Hino-shi, Japan, assignors to Kabushiki Kaisha Hitachi Seisakusho, Chiyoda-ku, Tokyo-to, Japan, a joint-stock company of Japan
Filed Jan. 25, 1965, Ser. No. 427,750
Claims priority, application Japan, Jan. 28, 1964, 39/3,804; Feb. 3, 1964, 39/5,230; July 3, 1964, 39/37,536
5 Claims. (Cl. 204—143)

ABSTRACT OF THE DISCLOSURE

An electrochemical machining apparatus and method where the workpiece is machined in a pressurized chamber and the electrolyte flow is split into at least two streams. The individual pressure of the electrolyte at the workpiece is controlled by balancing the pressures of the individual streams as they are channelled to the pressurized chamber.

This invention relates to techniques in so-called electrolytic machining and more particularly to a new method and apparatus for electrolytic machining.

It is a principal object of the invention to provide a method and apparatus of the above stated character wherein, by raising the pressure level of the electrolyte in the machining section of the apparatus containing the shaping electrode and the workpiece, the generation of bubbles of hydrogen gas in the electrolyte is completely prevented, and cavitation is prevented, thereby to improve the finishing precision of the work.

Other objects are attainment of the high machining process speed, simplification of the disposal of generated gases, and simplification of the disposal of electrolytic precipitation substances.

A further object is to provide an electrolytic machining apparatus of simple and inexpensive construction.

The foregoing objects, as well as other objects and advantages as will presently become apparent, have been achieved by the present invention, the nature, principle, and details of which will be more clearly apparent by reference to the following description taken in conjunction with the accompanying drawings, in which like parts are designated by like reference characters, and in which.

Figure 3:
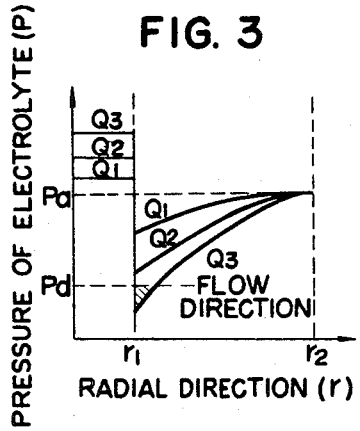
FIG. 3 is a graphical representation showing characteristic curves which indicate the relationship between electrolyte pressure and distance from the center of the electrolyte flow passage in the case of a known method wherein, in the arrangement shown in FIG. 2, the electrolyte flow passage is used as an electrolyte ejection orifice.
Figure 5A:
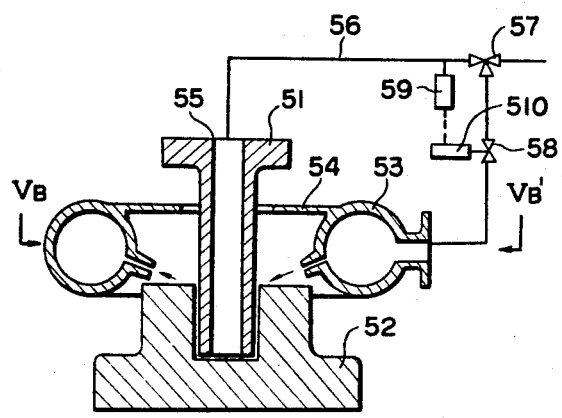
Figure 5B:
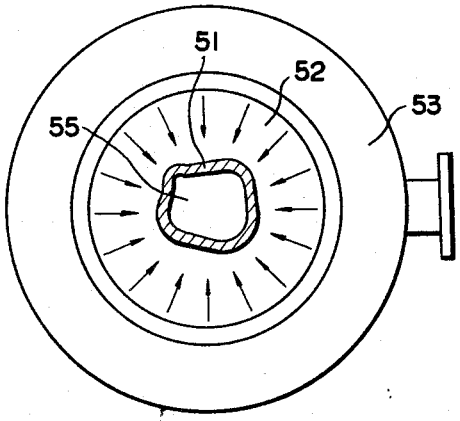
Figure 11A:
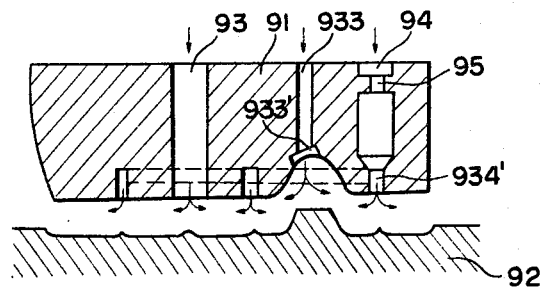
Figure 11B:
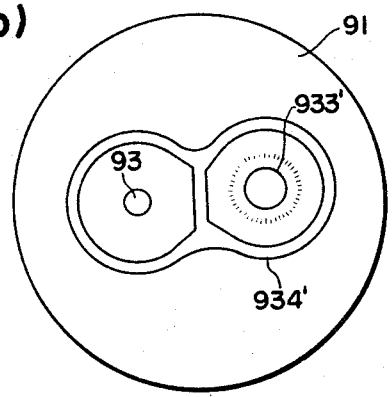

FIGS. 5(a) and 5(b) are respectively a sectional view and a cross sectional view showing the essential parts of another preferred embodiment of the invention;

FIG. 6 is a sectional view showing the essential parts of still another preferred embodiment of the invention;

FIG. 7 is a graphical representation, similar in nature to that of FIG. 3, in the case when the device of FIG. 6 is used;

FIG. 8 is a graphical representation showing curves which indicate relationships between electrolyte flow-rate and electrolyte pressure difference between the entrance and outlet of the flow in the case where a known electrolyte passage is used as an electrolyte ejection orifice and in the case where the electrolyte passage according to the invention as shown in FIG. 6 is used as an electrolyte discharge orifice;

FIGS. 9(a) and 9(b) are sectional views showing the essential parts of a further embodiment of the invention;

FIG. 10 is a sectional view showing the essential parts of a further example;

FIGS. 11(a) and 11(b) are sectional views showing a still further example; and

Figure 12:
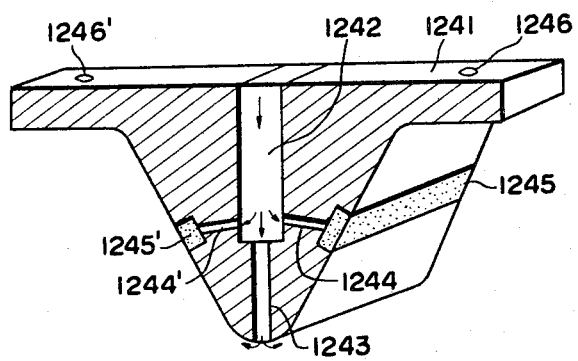

FIG. 12 is an isometric view, partly in section, showing a further embodiment of the invention.

Figure 1:
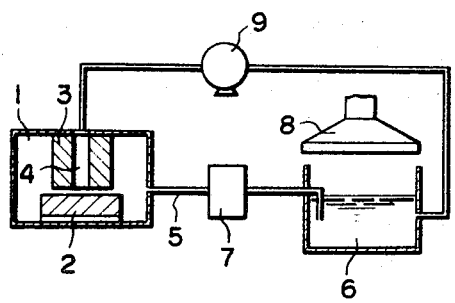
FIG. 1 is a simplified diagrammatic representation showing the essential parts of an example of a known electrolytic machining apparatus.

Heretofore, the most widely used method for electrolytic machining has been that of causing an electrolyte to flow between a mutually facing workpiece and a shaping electrode, applying voltage thereto, and thereby accomplishing machining by electrolysis. One example of apparatus for this electrolytic machining as shown in FIG. 1 is provided with a machining vessel 1 in which there are disposed a workpiece 2 and a shaping electrode 3 positioned to face the workpiece with a small gap therebetween. On its surface facing the workpiece, the shaping electrode 3 is provided with an electrolyte ejection orifice 4, through which an electrolyte is ejected under pressure to accomplish machining.

The electrolyte which has flowed out of the ejection orifice 4 passes through the gap formed by the workpiece 2 and the shaping electrode 3 and then flows through an electrolyte discharge pipe 5 connected to the machining vessel 1 to be collected in an electrolyte storage tank 6. Gases and precipitates such as iron hydroxide formed during the machining process are removed from this discharged electrolyte by means such as, for example, a precipitate removing device 7 and a gas removing draft device 8. The electrolyte in the storage tank 6 is returned to the machining vessel by a high-pressure pump 9 for electrolyte circulation. In the case of a known electrolytic machining apparatus of this character, however, the portion for discharge of the electrolyte is ordinarily connected to an electrolyte storage tank which is open to the atmosphere.

In the electrolytic machining process, a large quantity of hydrogen gas is generated as the process proceeds. The resulting hydrogen gas bubbles in the electrolyte imparts an extremely adverse effect on the accurate finishing of the workpiece surface and, moreover, overlay the surface of the shaping electrode. Therefore, the current density cannot be made very high, and the machining efficiency, consequently, is low.

For overcoming these difficulties, attempts have been made to remove generated hydrogen gas and precipitates and to increase efficiency, thereby to improve precision, by supplying electrolyte under high pressure and high speed in the case where the shaping electrode is large or in the case when it is necessary to increase the removal rate for workpiece. However, when the electrolyte feed pressure is increased in this manner, cavitation occurs in the vicinity of the outlet of the electrolyte ejection nozzle. As a result, not only does the removal rate for workpiece drop, but severe streaks of radial form from the orifice opening occur. The occurrence of these streaks lowers the finishing precision of the workpiece.

With the object of eliminating these streaks, various methods such as for example, that of ejecting the electrolyte as rotational motion is imparted thereto, have been proposed. In actual practice, however since cavitation occurs, and the effective electrical conductivity of the electrolyte in the central part decreases, it is difficult to prevent deterioration of dimensional precision. Another example of the proposed method is that of attempting to prevent occurrence of cavitation by using an electrode made of porous metal. Such electrodes, however, are not easy to produce and entail complications in handling. The state of the prior art, as far as we are aware, has been such that no suitable method for overcoming the above described difficulties has been found.

In view of this circumstance, we have made a study of the causes of cavitation in the case where an electrolyte is ejected from a machining electrode, beginning, first, with an investigation of the pressure distribution in the electrolyte from the outlet of the electrolyte ejection orifice to the outer surrounding part.

Figure 2:
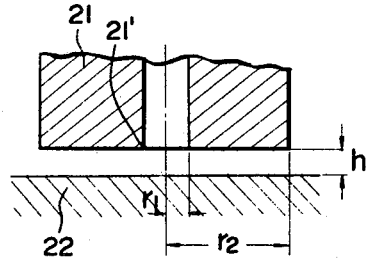
FIG. 2 is a partial sectional view indicating the relationship between a shaping electrode having a central passage for electrolyte flow and a workpiece.

For example, the case illustrated in FIG. 2 may be considered. The essential quantities involved in this case are the radius $r_2$ of the machining electrode 21, the radius $r_1$ of the spout or outlet of the electrolyte jet, and a gap $h$ between the electrode 21 and the workpiece 22, the electrode with a circular electrolyte passage in its center being used for hole sinking. In this case, for the conditions of an electrolyte density P, an electrolyte supply pressure $P_o$, a flowrate Q of electrolyte supplied through the ejection orifice, and the relationship of $$2\pi r_1 h \ll \pi r_1^2$$

the pressure P at a point at a radial distance $r(r \geq r_1)$, neglecting the viscous resistance of the electrolyte flowing through the gap, can be expressed by the following equation:

$$P = P_o - \frac{PQ^2}{8\pi^2 h^2 r_1^2}\left(\frac{r_1}{r}\right)^2 \qquad (1)$$

The relationship between the radial distance $r$ from the center of the electrolyte ejection orifice and the electrolyte pressure P, in the conventional case where the pressure of the electrolyte discharge point $(r=r_2)$, is equal to the atmospheric pressure, from the above Equation 1 is indicated in FIG. 3 for each of different flowrates Q.

In FIG. 3, the abscissa represents the distance $r$, and the ordinate represents the electrolyte pressure P, the flowrates having a relationship of $Q_1 < Q_2 < Q_3$.

As is apparent from FIG. 3, the electrolyte supply pressure $P_o$ drops abruptly at the electrolyte orifice opening $(r=r_1)$ and thereafter increases progressively with increasing $r$, becoming equal to the atmospheric pressure at the electrolyte discharge point $(r=r_2)$. Furthermore, the pressure drop at $r_1$ is more pronounced with a higher flowrate Q. That is, if this pressure P decreases to the vapor pressure $P_a$ (of the order of 200 mm. Hg absolute pressure, in the case or ordinarily used electrolytes at room temperature) of the electrolyte at the time, cavitation will occur.

The flowrate causing this cavitation generation to begin is substantially lower than the flowrate necessary for ordinary electrolytic machining. Therefore, cavitation may be considered to occur almost without exception in ordinary electrolytic machining.

Another cause of this cavitation phenomenon is high flow velocity. For example, in the case where the periphery of the electrolyte orifice opening has a sharp corner as at 21 in FIG. 2, the flow velocity around this corner increases locally to a very high value which gives rise to cavitation at the corner 21' even when the mean pressure in the vicinity of the orifice opening is higher than the vapor pressure. Accordingly, cavitation of this nature occurs not only in the case of radial outward flow from the orifice opening as a center as mentioned above but similarly also in the case of two-dimensional ejection from a long slit.

One measure which at first appears obvious for preventing this kind of cavitation is to round off the corner 21'. However, in order to prevent cavitation completely, it would be necessary to provide a rounded corner of a radius which is prohibitively large from the viewpoint of machining precision.

The cavitation phenomenon of the above described character is disadvantageous for electrolytic machining because, once it is generated, it progressively spreads downstream, and even if the electrolyte pressure rises and returns to the vapor pressure, the vapor state does not immediately return to the liquid state through condensation, whereby the cavitation spreads through a substantial distance downstream while the vapor state is maintained. That is, in some cases the cavitation is not confined to the cross-hatched part in FIG. 3 but spreads extensively into a wide region downstream.

In view of the above considerations, it is apparent that an electrolytic machining method in which the electrolyte is ejected from a shaping electrode is inevitably accompanied by the generation of cavitation as a natural result.

The present invention contemplates the prevention of initiation of cavitation, which could not be avoided by known methods as described above, by providing a method and means whereby lowering of the electrolyte pressure in the machining section including the shaping electrode and the workpiece is prevented.

For this purpose, the electrolytic machining according to the invention is accomplished by providing means such as a throttle valve to regulate the electrolyte flow-rate and maintaining the static pressure of the electrolyte at the point where it is discharged from the part where the workpiece is being actually removed at a value higher than atmospheric pressure, or causing electrolyte supplied under the pressure between the workpiece and the shaping electrode to be discharged from an alectrolyte passage provided in the shaping electrode or the workpiece, in the ordinary method.

By another embodiment of the invention, machining is accomplished as electrolyte is ejected from a main electrolyte ejection orifice of the shaping electrode or the workpiece disposed to face the electrode, and as, at the same time, electrolyte is ejected, through an opening of a slot shape or circular groove provided in the shaping electrode, transversely into the flow path between the shaping electrode and the workpiece of the electrolyte ejected from said main electrolyte ejection orifice.

The specific nature of the invention will be more fully understood from the following detailed description with respect to preferred embodiments of the invention.

Figure 4:
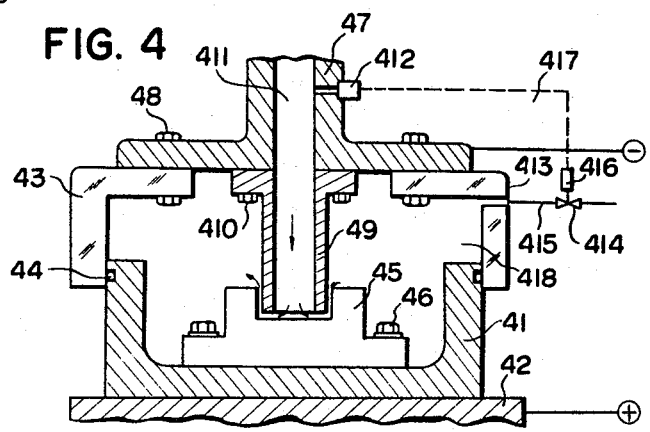
FIG. 4 is an sectional view showing the principal parts of a preferred embodiment of the electrolytic machining apparatus according to the invention.

In one embodiment of the invention as shown in FIG. 4, means such as a throttle valve to regulate electrolyte flow are provided, and the static pressure of the electrolyte at the point where it is discharged from the part where the actual machining is taking place is maintained at a pressure which is higher than atmospheric pressure. The workpiece 45 is fixed by screws 46 to a work support 41 made of an electrically conductive material and supported on a base 42. The work support 41 is joined in sliding contact with a pressure vessel 43 consisting of a structure made of an electrically insulating material or a structure with an insulating material deposited on the necessary parts thereof by painting or deposition, a leakproof packing 44 being interposed between the work support 41 and the pressure vessel 43.

A shaping electrode 49 is fixed by screws 410 to an electrode feed spindle 47 which is fixed by screws 48 to the pressure vessel 43, the shaping electrode 49 being disposed to confront the workpiece 45. The spindle 47 and the electrode 49 are provided therethrough with an electrolyte passage 411. The spindle 47 is provided on one side of its passage 411 with an electrolyte pressure detector 412 for monitoring the electrolyte pressure within the passage 411. The pressure vessel 43 is provided with an electrolyte discharge port 413 to which there is connected an electrolyte discharge pipe 415 provided with an electrolyte throttle valve 414 for elevating the pressure level of the electrolyte in the machining section.

By thus elevating the pressure level within the entire machining section by means of the throttle valve 414, the generated hydrogen, without being released as gas, is almost entirely absorbed and dissolved in the electrolyte, whereby the disadvantages of known electrolytic machining methods are completely eliminated.

The principle of this gas prevention action will be apparent from the following description with respect to an example involving specific values. In general, the relationship between pressure and the solubility of a gas with respect to a liquid may be expressed by Henry's law, as follows:

$$P/X = K \quad (2)$$

where:

P is the pressure of the gas;
X is the quantity of the gas dissolving in a specific quantity of the liquid; and
K is a constant.

That is, the solubility of a gas with respect to a liquid increases substantially in proportion to the pressure. Accordingly, if the value I of the electric current passed through the machining section and the electrolyte flowrate $Q\omega$ are given, the pressure necessary for complete absorption and dissolving of the generated hydrogen by the electrolyte can be determined by using the relationship of Equation 2. Then, by maintaining the pressure at the outlet of the machining section at a value equal to the pressure so determined or a higher value, all of the hydrogen generated in the gap between the electrode and the workpiece can be dissolved in the electrolyte, and formation of bubbles can be completely prevented.

As one example, the case of a machining electric current I of 2,000 amperes, an electrolyte consisting of an aqueous solution of NaCl of 1.1 normal concentration, and an electrolyte circulation flowrate $Q\omega$ of 20 liters per minute will be considered.

Since the electrochemical equivalent of hydrogen is 0.116 cm.$^3$/A sec. (at 0° C., 760 mm. Hg), the quantity $QH_2$ of hydrogen generated by the electrolytic action with a machining current of 2,000 amperes is as follows: $QH_2 = 232.4$ cm.$^3$/sec. (at 0° C., 760 mm. Hg). Then, if the electrolyte temperature at the machining section is assumed to be 20 degrees C., Bunsen's absorption coefficient $\alpha$ with respect to the hydrogen gas of the electrolyte is as follows: $\alpha = 0.01529$. Therefore, at the flowrate of $Q\omega = 20$ l./min., the quantity per unit time $QH_2'$ of hydrogen dissolved in the electrolyte under a pressure of 1 atmosphere and carried away is as follows:

$$QH_2' = \alpha Q\omega = 5.1 \text{ cm.}^3/\text{sec. (at 0° C., 760 mm. Hg)} \quad (3)$$

This flowrate is extremely small in comparison with the rate of generation of hydrogen, $QH_2 = 232.4$ cm.$^3$/sec.

That is, under atmospheric pressure, almost all of the generated hydrogen assumes the gaseous state and is released. If, as a supposition, all of the generated hydrogen is to be dissolved under atmospheric pressure, the necessary electrolyte flowrate $Q\omega_1$ would be of the following magnitude:

$$Q\omega_1 = \frac{QH_2}{\alpha} = 912 \text{ l./min.} \quad (4)$$

Such a high flowrate is almost unattainable in actual practice by ordinary electrolytic machining methods.

If, in the case of the present embodiment of the invention, the pressure $P_2$ at outlet of the machining section, is maintained at, for example, $P_2 = 46$ kg./cm.$^2$, the electrolyte flowrate $Q\omega_{30}$ necessary for dissolving all of the generated hydrogen can be obtained from Henry's law as:

$$Q\omega_{30} = \frac{Q\omega_1}{P_2} = 19.83 \text{ l./min.} \quad (5)$$

This value of $Q\omega_{30}$ is approximately equal to the aforementioned circulation flowrate $Q\omega = 20$ l./min. That is, in this example, all of the hydrogen generated in the machining section will be dissolved in the electrolyte if the pressure $P_2$ is maintained at 46 kg./cm.$^2$ or higher pressure.

In the case where such an apparatus is used, the electrolyte pressure of the machining section is lowered by the electrolyte throttle valve 414 from $P_2$ to atmospheric pressure $P_a$, and then the electrolyte so reduced in pressure is led to a storage tank. When the electrolyte leaves the throttle valve 414, since its pressure drops abruptly from $P_2$ to $P_a$, almost all of the dissolved hydrogen becomes gaseous, as is apparent from Henry's law, and is discharged through means such as the draft device 8 shown in FIG. 1.

Thus, despite its simple construction, the electrolyte throttle valve 414 installed in the above described manner accomplishes the two very effective functions of maintaining the electrolyte at a specified high value and, at the same time, of removing from the electrolyte the large quantity of hydrogen dissolved therein.

Since there is the possibility of clogging of the throttle valve 414 by iron hydroxide and other precipitates contained in the electrolyte leaving the outlet, it is preferable to install a device for removal of such impurities in the flowpath between the outlet and the throttle valve 414.

The method according to the present invention is similarly effective also in the case of an electrolytic machining apparatus in which the electrolyte is caused to flow in from a direction parallel to the gap between a workpiece and a confronting shaping electrode.

However, in electrolytic machining, the hydrodynamic resistance of the electrolyte between the shaping electrode and the workpiece increases as the machining process progresses because the shape of the workpiece approaches that of the shaping electrode as the machining progresses. Consequently, the supply pressure of the electrolyte supplied from the electrolyte supply pump increases, and the electrolyte supply flowrate decreases. Accordingly, the electrolyte discharge pressure which was adjusted by means such as a throttle valve at the start of machining exhibits a tendency to decrease. As a result, in some cases, cavitation occurs, and a satisfactory finish surface cannot be obtained. Moreover, the machining speed drops.

In the case where the electrolyte supply pressure fluctuates in this manner and in other cases such as that of different shaping electrode or of pressure vessels of different sizes, it is necessary to adjust the electrolyte pressure for each case, which necessity is troublesome in actual machining.

In such cases, an automatic pressure regulating means such as that shown in FIG. 4 is effective. This means comprises a controller 416 for controlling the throttle valve 414, the aforementioned electrolyte pressure detector 412, and means 417 for transmitting detected pressure or corresponding quantity from the detector 412 to the valve controller 416. By the use of such means, variations in the electrolyte supply pressure which occur as the machining progresses are detected and utilized to control means such as a throttle valve for regulating the flow of electrolyte, whereby it is possible to maintain, automatically, the pressure of the electrolyte in the electrolyte discharge point always equal to or higher than atmospheric pressure during the machining operation.

To carry out machining by means of the apparatus shown in FIG. 4, voltage is applied across the workpiece 45 and the shaping electrode 49 disposed to confront the workpiece 45 with a specific gap therebetween, with positive and negative polarity, respectively, and the electrolyte is supplied through the electrolyte supply passage 411 provided in the spindle 47 and shaping electrode 49 and ejected under pressure to the actual machining section to carry out machining. As the machining progresses, the pressure vessel 43 to which the shaping electrode 49 is fixed is moved relative to the workpiece support 41, thereby to maintain constant the gap between the electrode 49 and the workpiece 45, and electrolyte discharged from the actual machining region is discharged into the electrolytic machining chamber 418 formed by the pressure vessel 43 and the workpiece support 41. The electrolyte in the electrolytic machining chamber 418 passes through the discharge port 413 provided in the pressure vessel 43, through the pipe 415, and to the throttle valve 414, by which the electrolyte is reduced in pressure from a specified value higher than atmospheric pressure to atmospheric pressure and is discharged.

In this example, since the spindle 47 to which the shaping electrode 49 is fixed in turn to the pressure vessel 43, the feeding of the shaping electrode with the progress of machining is effected by feeding the pressure vessel 43 or by displacing workpiece support 41. This feeding may be effectively accomplished by adapting either the shaping electrode or the workpiece to be movable within the pressure vessel.

During machining operation in the apparatus of the above described arrangement and construction, the pressure of the electrolyte within the electrolyte supply passage 411 is caused to vary by changes such as increase in the hydrodynamic resistance between the workpiece 45 and the shaping electrode 49 accompanying the progress of machining. As mentioned briefly hereinbefore, the electrolyte pressure in the passage 411 is monitored by the detector 412 and transmitted to the throttle valve controller 416 to control the throttle valve 414. For example, when the hydrodynamic resistance between the workpiece 45 and the shaping electrode 49 increases as the machining progresses, the electrolyte pressure within the passage 411 naturally increases, whereby the throttle valve is automatically controlled to cause the pressure within the electrolytic machining chamber to increase.

The electrolyte discharge opening 413 provided in the pressure vessel 43 is preferably disposed in the uppermost part of the pressure vessel 43 so as to be effective in discharging any hydrogen gas which may be generated during machining.

The throttle valve controller 416 is preferably present so as to maintain the electrolyte pressure within the electrolytic machining chamber 418 at a value which is from ½ to ⅓ of the supply pressure. This specific range is based on our discovery that, as long as the pressure within the chamber 418 is maintained at a value of from ½ to ⅓ of the supply pressure, the generation of cavitation within the machining section can be prevented.

Another embodiment of the invention is shown in FIGS. 5(a) and 5(b), which is an improvement of the above described example, FIG. 5(b) being a view along the plane and direction indicated by line and arrows VB–VB′. This arrangement is particularly suitable for the case where the electrode size becomes large, whereby it is necessary to increase the thickness of the pressure vessel, and it becomes difficult to carry out machining by applying back pressure.

The apparatus comprises essentially a shaping electrode 51 having an electrolyte supply passage 55, to which an electrolyte supply pipe 56 is connected, a doughnut-shaped (toroidal) nozzle pressure vessel 53 encompassing the shaping electrode 51, an electrolyte jet baffle plate 54 for preventing scattering of the electrolyte jet, and a workpiece 52 disposed to confront the electrode 51. In addition, there are provided an electrolyte distributor 57 for distributing the electrolyte to the passage 55 and the pressure vessel 53, a throttle valve 58 for controlling the electrolyte flow to the pressure vessel 53, an electrolyte supply pressure detector 59 for detecting the pressure in the pipe 56, and a controller 510 for controlling the throttle valve 58 in response to the pressure detected by the pressure detector 59.

By this arrangement, machining can be carried out as the liquid pressure at the discharge part of the actual machining section is maintained above atmospheric pressure by the ejection of electrolyte from the nozzle pressure vessel 53. Furthermore, when a variation in the electrolyte supply pressure occurring as the machining progresses is detected by the electrolyte supply pressure detector 59, the throttle valve 58 is controlled by the controller 510, whereby the electrolyte ejection pressure from the nozzle pressure vessel 53 is adjusted, and it is possible thereby to maintain always above atmospheric pressure the electrolyte pressure at the discharge part of the actual machining section.

It will be obvious that many modifications can be made in the above described apparatus. For example, depending on the circumstances the electrolyte supply pressure can be controlled through the use of a relief valve such as to maintain constant the pressure of the nozzle pressure vessel 53, instead of detecting and controlling the electrolyte supply pressure, to obtain similar effective results. Furthermore, the transmission means for transmitting the measurand detected by the electrolyte pressure detector to the throttle valve controller may be electrical, mechanical, or electro-magnetic wave type.

Since, as will be apparent from the above description, the electrolyte pressure in the discharge part of the actual machining section is always maintained constant during machining, there is no necessity, as heretofore, of adjusting the throttle valve for each instance of change of the electrolyte supply pressure, change of the kind of shaping electrode, and change of volume of the machining chamber. Accordingly, there is no necessity whatsoever for the operator to make adjustments during machining, and automatic machining becomes possible. Moreover, since the electrolyte pressure at the discharge part is always maintained above atmospheric pressure, cavitation does not occur, and accordingly, the accuracy of the machining finish is improved. Furthermore, speedup of the machining process is also possible, and lowering of fabrication costs is possible.

In still another embodiment of the invention as shown in FIG. 6, the electrolyte supplied under pressure between the workpiece and the shaping electrode is discharged through an electrolyte passage provided in the shaping electrode and serving as a discharge part. This arrangement is based on the following principle.

If the electrolyte is considered to be a nonviscous ideal fluid, Equation 1 can be applied as an equation relating to pressure. As a part of the electrolyte flowing into the gap between the shaping electrode and workpiece at a pressure $P_2$ at a point of $r_2$, that is, the entrance to the gap, moves toward the center, its pressure decreases. Then, when this part of the electrolyte reaches the discharge port at a point $r_1$ and enters the electrolyte discharge passage in the center of the shaping electrode, the pressure should rise in a discontinuous manner as from A to B in FIG. 7 since the cross section area of the flow abruptly increases.

However, since an actual fluid has viscosity, there is almost no rise in the pressure even when such an abrupt increase occurs in the cross section, and almost all of the kinetic energy is dissipated because of the viscosity as is well known. For this reason, an actual flow is accompanied by a certain rise in pressure at approximately the point $r_1$ and, with this pressure, continues into the discharge passage in the shaping electrode. Consequently, if the electrolyte discharge passage opens, for example, into the atmosphere, the pressure at the point $r_1$ assumes a value substantially close to atmospheric pressure, and the pressure distribution curve JA shifts upwardly to assume a shape as indicated by IC. Accordingly, the actual pressure at the outer periphery gap entrance $(r_2)$ becomes $P_2'$.

From the above consideration, it becomes apparent that the minimum pressure in the gap becomes the value at $r_1$, and, in the case where the pressure within the discharge passage is maintained at a certain value above atmospheric pressure by applying approximately atmospheric pressure or a back pressure, the minimum pressure becomes said certain value, the pressures at the other parts becoming higher than this value at various points. Since, in general, vapor pressures are substantially lower than atmospheric pressure, no cavitation whatsoever occurs in the practice of the present invention.

The apparatus shown in FIG. 6 is an example of an electrolytic machining apparatus designed on the basis of the above consideration. In this apparatus, a workpiece 62 is machined by a shaping electrode 61 fixed to the lower end of an electrode feed spindle 63 adapted to be axially movable relative to the workpiece 62. The workpiece 62 is mounted on a workpiece support 65, a part of which is fitted into a high-pressure vessel 64 having a principal structure made of metal and coated with electrically insulating material over its parts to contact the electrolyte, packings 67' being interposed between the high-pressure vessel 64 and workpiece support 65 to prevent outward leakage of electrolyte. The vessel 64 and support 65 are coupled by screws 68. The top of the high-pressure vessel 64 is closed by a cover plate 66 through which the spindle 63 passes. Packings 67 and 67'' are provided to prevent electrolyte from leaking out.

The spindle 63 is provided at one part of its outer surface with screw threads which are engaged by the internal threads of a worm wheel 69, the outer teeth of which engage with a worm 610 driven by a motor 612 through a shaft 611.

The high-pressure vessel 64 is provided with an electrolyte supply port 613 for supplying electrolyte into the electrolyte chamber 614. The shaping electrode 61 and the electrode feed spindle 63 are respectively provided with electrolyte discharge passages 615 and 616.

Machining by means of the apparatus of the above described arrangement is carried by mounting the workpiece 62 on the workpiece support 65, coupling the workpiece support 65 to the high-pressure vessel 64 with screws 68, presetting to a specified distance the gap between the shaping electrode 61 and the workpiece 62, then supplying under pressure the electrolyte through the electrolyte supply port 613 into the electrolyte chamber 614, and connecting the positive and negative sides of a D-C power source to the workpiece and the shaping electrode, respectively.

Since the electrolyte is constantly supplied under pressure through the supply port 613 during the machining process, the electrolyte flowing past the outer periphery of the shaping electrode 61 traverses the gap between the electrode 61 and the workpiece 62, is discharged through the electrode discharge passages 615 and 616, and is discharged to the outside from the main structure of the electrolytic machining apparatus. As the machining progresses, the adjustment of the gap between the electrode 61 and the workpiece 62 is accomplished by axial movements of the electrode feeding spindle 63 caused by the rotation of the worm wheel 69 driven by the worm 610, which is in turn driven by the motor 612.

In the above described embodiment of the invention, in order to cause the electrolyte to flow from the outer periphery of the shaping electrode into the gap between the shaping electrode and the workpiece, the high-pressure vessel 64, the workpiece support 65, and the cover plate 66 are adapted to form a high-pressure, sealed vessel, the high-pressure vessel 64 being coupled by screws 68 to the workpiece support 65, and the electrode feeding spindle 63 being adapted to be movable independently of the high-pressure vessel 64.

The electrode feeding spindle 63 is provided at its lower end with a flange 617 for holding the electrode, which flange, moreover, is convenient in that, upon completion of machining, the screws 68 can be removed, and the spindle 63 can be caused to rise, thereby to lift the cover plate 66 and the high-pressure vessel 64. Further convenience is afforded by a construction whereby only the cover plate 66 can be removed. Furthermore, a space 614 is constantly maintained between the flange 617 and the cover plate 66 during the machining operation so that the pressures on both sides of the flange are equalized, whereby it is possible to reduce the lifting force imparted to the spindle 63 due to an increase in the electrolyte supply pressure.

It will be obvious that materials suitable for the principal structure of the pressure vessel 64 are not limited to metals, insulating materials also being suitable provided that they can withstand the electrolyte supply pressure.

Furthermore, while the above described example of the invention illustrates the case wherein the electrolyte discharge port is disposed in the shaping electrode, it will be apparent that a similar function effect can be obtained in the case where this discharge port can be provided on the workpiece side. Moreover, similar application can be made also in a shaping electrode provided with a plurality of discharge ports.

Experimental results of an investigation of the relationship between electrolyte flowrate (cc./sec.) and electrolyte pressure difference (kg./cm.$^2$) at radial distances $r_1$ and $r_2$ in the case of application of the electrolytic machining method as exemplified by the above described embodiment to a flat machining surface and a simple cylindrical electrode having in its center a single electrolyte passage as shown in FIG. 2 are indicated in FIG. 8. These results were obtained with a machining gap of 0.2 mm. and with electrodes 1, 2 and 3 of 12 mm. outer diameter and inner diameters of 2, 4 and 6 mm., respectively. Curves No. 1, 2, and 3, which correspond respectively to said electrodes 1, 2 and 3, indicate the results obtained when the electrolyte is discharged through the passage in the shaping electrode according to the above described method, and similarly corresponding curves No. 1', 2', and 3' indicate the results obtained when the electrolyte is ejected out of said passage according to the known practice. In the case of electrolyte ejection, measurements were made with back pressure applied to cause a rise in the peripheral pressure so as to prevent initiations of cavitation.

As is apparent from FIG. 8, the flowrates obtained by the method of the above described embodiment are substantially higher for the same pressure differences than those obtained by the known method of electrolyte ejection from the electrolyte passage.

By the use of the method and apparatus according to the invention as described above, it is possible to prevent severe streaking on the machined surface due to cavitation, which streaking has been a problem associated with conventional methods wherein machining is carried out as electrolyte is supplied from an electrolyte ejection orifice of the shaping electrode to the confronting workpiece surface, whereby a finished surface of high machining precision can be obtained.

Furthermore, in the conventional method, because the electrolyte discharge part is at atmospheric pressure, the electrolyte pressure in the machining region is at a pressure below atmospheric pressure. In contrast, the present invention provides a technique whereby the pressure in the machining region is raised above atmospheric pressure, and for this reason the formation of hydrogen bubbles tending to be generated at the time of machining can be prevented. Furthermore, a very high machining current density can be obtained, and the machining speed can be greatly increased, which contributes further to the prevention of cavitation, whereby an excellent surface finish can be obtained.

In addition, even if hydrogen gas is generated at the time of machining in the machining section, it can be led directly to the electrolyte discharge port and disposed of in a simple manner. Furthermore, since a higher flowrate and, accordingly, a higher flow velocity can be obtained for the same pressure than in the conventional method wherein the electrolyte is ejected from an ejection orifice, generated hydrogen gas and precipitates resulting from electrolysis are rapidly removed, whereby excellent finish precision can be attained. The technique of this invention, moreover, eliminates the operational problems of corrosion of the metal at the electrode periphery and difficulty of disposal of the electrolyte caused by the scattering of electrolyte from the electrode periphery occurring when the electrolyte supply pressure is increased in conventional methods.

In a further embodiment of the invention as shown in FIG. 9, which shows the electrode constituting the principal part of the apparatus, the principal electrode structure 91, which is disposed to confront a workpiece 92, has through its center an electrolyte ejection passage with an opening facing the workpiece and an electrolyte supply passage 94 having at its lower end an annular electrolyte supply groove 94' disposed on the surface of the electrode structure 91 facing the workpiece about the passage 93 as its center. A throttling device 95 for regulating the electrolyte supply pressure is secured by a screw 95' to the electrolyte supply passage 94. It will be obvious that the electrolyte ejection passage 93 and the supply passage 94 can be supplied by branches from a single electrolyte supply pipe. The electrode as viewed from the workpiece is shown in FIG. 9b.

Machining is accomplished by the above described electrode as the electrolyte is ejected out of the passage 93, and electrolyte is ejected at the same time out of also the electrolyte supply groove 94'. During this operation, the throttling device 95 is so adjusted that the pressure of the electrolyte flowing out of the groove 94' is equal to or less than the pressure of the electrolyte flowing out of the passage 93.

That is, in the machining aparatus as described above, the flow velocity in the path from the passage 93 to the groove 94' can be made substantially smaller than that in the known arrangement of only an electrolyte ejection passage. It is thereby possible to reduce effectively the pressure drop accompanying increases in flow velocity, thereby to prevent the generation of cavitation.

In a modification as shown in FIG. 10 of the electrode shown in FIG. 9, a porous, electrically conductive material 96 is provided at the outlet of the groove 94' to regulate pressure in place of the throttling device 95 shown in FIG. 9.

In a further embodiment of the invention as shown in FIG. 11, a plurality of electrolyte ejection orifices is provided. The electrode main structure 91 is provided with electrolyte ejection passages 93 and 933, the passage 933 having an opening at a recessed part of the surface of the shaping electrode facing the workpiece 92. There is further provided an electrolyte supply passage 94 supplying electrolyte through a throttle orifice 95 to two supply grooves of substantially annular form around passages 93 and 933, respectively, as centers. The ejection outlet of the ejection passage 933 is provided with a porous metal piece 933' to prevent extreme lowering of the flowrate at the opening of the ejection passage 93 due the low hydrodynamic resistance at the opening of ejection passage 933 at the start of machining, that is, when the surface of the workpiece is planar. By providing a porous metal piece of high hydrodynamic resistance in this manner, the flowrate at the opening of the passage 933 is caused to be less than the flowrate at the opening of the passage 93.

By the above described construction it is possible to attain the same effective operation as in the case of the example shown in FIG. 9.

While in the above described embodiments of the invention, one or a plurality of electrolyte ejection passages are used, and electrolyte is caused to flow radially at least in the vicinity of the opening or openings of said passage or passages, the present invention can be applied also to an electrode having main electrolyte ejection passages and orifices of slit shape as illustrated by one example shown in FIG. 12. In this embodiment, the electrode principal structure 1241 is provided with a main electrolyte supply passage 1242, a main electrolyte ejection groove 1243, auxiliary electrolyte ejection passages 1244 and 1244', and porous metal strips 1245 and 1245' provided in the groove openings of the passages 1244 and 1244', respectively. The electrode structure 1241, which is secured to an electrode feeding member by screws passed through holes 1246 and 1246', has a protruding ridged shape with a rounded ridge.

At the start of machining with an electrode of the above described shape, in general, when electrolyte under high pressure is ejected from the main ejection groove 1243, the flow velocity abrupting increases locally at the corners of the opening of the main ejection groove, and the pressure drops. For this reason cavitation develops, and severe streaking occurs to cause a lowering of the machining speed.

However, by providing auxiliary electrolyte grooves 1244 and 1244' and ejecting electrolyte at reduced pressure through the porous metal strips 1245 and 1245' as in the example shown in FIG. 12, it is possible to reduce the flowrate of the electrolyte through the main supply groove 1243. Accordingly, development of cavitation is prevented, and an excellent machined finish can be obtained.

While the above described embodiment of the invention illustrates the case wherein the main electrolyte ejection passage is provided in the shaping electrode, a similar construction can also be used in cases where it is possible to provide this passage in the workpiece.

In the conventional case of a single electrolyte ejection passage, the hydrogen gas generated by the machining and the electrolysis precipitates flow downstream together with the electrolyte flow, and the concentrations of the hydrogen gas and the precipitates increase with the distance downstream. In some instances, this concentration increase causes shorting and discharge and has an adverse effect on the machining precision.

By the electrolytic machining technique according to the present invention, however, since fresh electrolyte is supplied into the electrolyte flow path where the concentrations of hydrogen gas and precipitates are increasing, these concentrations are reduced and rendered uniform, whereby it is possible to prevent lowering of the finish precision due to accumulation of these impurities.

As described above, the method and apparatus according to the present invention makes possible the prevention of cavitation and streaking due thereto, thereby making possible the production of excellent finished surfaces. Furthermore, it is not necessary to resort to rotational ejection of the electrolyte in order to prevent streaking due to cavitation, and it is also not necessary to mix in a gas such as nitrogen gas. Accordingly, complicated accessory devices are not required, and only an inexpensive apparatus is necessary.

Furthermore, since it is possible to use a higher electrolyte flowrate than in the conventional case of a single electrolyte ejection passage, the machining speed is remarkably increased. It is a further advantage of the invention that the fabrication of the electrode is simple, and its operation is comparable to those used heretofore.

Thus, the present invention affords not only a substantial improvement in the finish precision but also speed-up in machining speed, simplification of hydrogen gas disposal and of precipitate disposal, and simplification of construction and reduction in cost of the electrolytic machining apparatus. Accordingly, the invention affords reduction in the prices of products manufactured by electrolytic machining.

It should be understood, of course, that the foregoing disclosure relates to only preferred embodiments of the invention and that it is intended to cover all changes and modfications of the examples of the invention herein chosen for the purposes of the disclosure, which do not constitute departures from the spirit and scope of the invention as set forth in the appended claims.

What we claim is:

1. In an apparatus for electrochemically machining a workpiece, the apparatus including means for holding the workpiece, an electrode tool having a passage for channelling electrolyte therethrough, means for advancing said electrode tool relative to the workpiece and for mantaining a gap therebetween thereby defining a working space, pressure chamber means enclosing said work space, supplying means and regulating means for moving electrolyte to said work space and through said electrode tool passage at a pressure substantially sufficient to suppress the formation of gas bubble caused by electrolysis; and electrical means for making the electrode tool predominantly cathodic and said workpiece predominantly anodic, the improvement wherein said pressure chamber has wall means defining at least one passage for channeling electrolyte under pressure from said supplying means and said regulating means substantially transversely of said electrode tool passage to said work space whereby the pressure of said electrolyte in said chamber passage is balanced with the pressure in said electrode passage at said regulating means.

2. The improvement as defined in claim 1, wherein said regulating means is a throttle valve in the supply passage.

3. The apparatus of claim 2 wherein said passage in said chamber is in the form of annular grooves in series with said throttle valve.

4. The improvement as defined in claim 1, wherein said regulating means is at least partly of a porous material inserted in the output surface of said supply passage in the electrode.

5. In a method of electrolytically removing material from a workpiece by means of an electrode having an electrolyte passage therethrough, and being movable relative to said workpiece to define a work gap therebetween and wherein said work gap is enclosed by a pressure chamber said method including supplying electrolyte into said chamber through said work gap and through said passage in said electrode maintaining the electrolyte in said chamber at a predetermined pressure sufficiently high to substantially suppress the formation of bubbles at the work gap, impressing an electric potential across said gap to make said workpiece predominantly anodic and said electrode predominantly cathodic whereby material is removed from said workpiece and simultaneously advancing said electrode relative to said workpiece to maintain said gap, the improvement wherein said electrolyte is split into at least two streams wherein one stream is channeled under pressure to said work gap and through a passage in said chamber substantially transverse to the flow path of the electrolyte supplied through said electrode whereby the pressure in said chamber remains substantially at the predetermined pressure.

References Cited

UNITED STATES PATENTS

| | | | |
|---|---|---|---|
| 3,058,895 | 10/1962 | Williams | 204—143 |
| 3,239,438 | 3/1966 | Voorhees | 204—143 |
| 3,255,097 | 6/1966 | Williams | 204—143 |
| 3,293,166 | 12/1966 | Cowine | 204—143 |

FOREIGN PATENTS 335,003  9/1930  Great Britain.

ROBERT K. MIHALEK, *Primary Examiner.*